Aug. 7, 1934.  T. V. D'ORNELLAS  1,969,595
OPENING AUTOMOBILE TOP
Filed June 8, 1929  4 Sheets-Sheet 1

Inventor
Thomas Vincent d'Ornellas
By Addison A. Armstrong
attorney

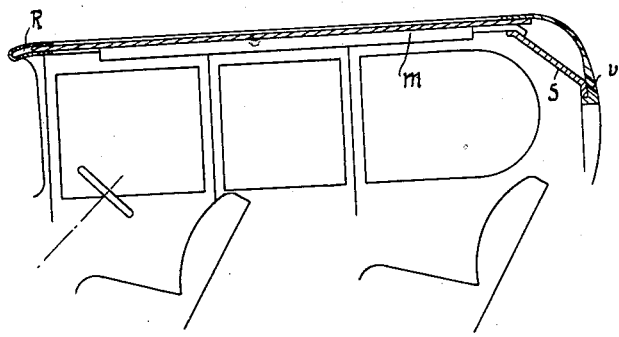
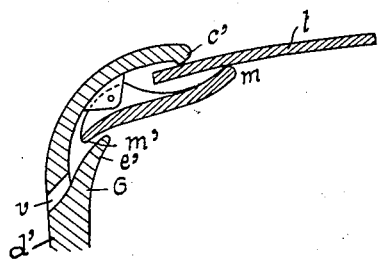
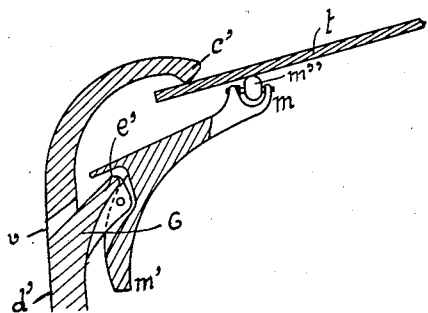

Aug. 7, 1934.   T. V. D'ORNELLAS   1,969,595
OPENING AUTOMOBILE TOP
Filed June 8, 1929   4 Sheets-Sheet 3

Inventor
Thomas Vincent d'Ornellas
By Addison A. Armstrong
Attorney

Aug. 7, 1934.   T. V. D'ORNELLAS   1,969,595
OPENING AUTOMOBILE TOP
Filed June 8, 1929    4 Sheets-Sheet 4

Inventor
Thomas Vincent d'Ornellas
By Addison G. Armstrong
Attorney

Patented Aug. 7, 1934

1,969,595

UNITED STATES PATENT OFFICE 1,969,595

OPENING AUTOMOBILE TOP

Thomas Vincent d'Ornellas, Talence, France, assignor of one-half to Arturo de Heeren, San-Sebastian, Spain Application June 8, 1929, Serial No. 369,365
In France June 13, 1928

14 Claims.  (Cl. 296—137)

Removable covers now in use, and particularly those used as automobile tops usually have the following disadvantages:

First, they are not strictly tight.

Second, they are not rigid and consequently are subject to rattling.

Third, their manipulation is complicated and troublesome.

Fourth, they cannot be strictly opened to the desired extent.

Fifth, they necessitate supporting frames or rigid supporting rods which constitute an annoyance, and in certain cases, a serious danger.

The object of my present invention is to overcome these disadvantages above enumerated.

In this end, the covering, formed of a flexible surface, eventually reinforced with light flexible reinforcing, has its longitudinal edges guided in grooves provided with a lower projecting edge which can be raised with respect to the upper edge, in order to clamp the edges of the covering and curve said covering transversely.

I thus assure securing of the covering, its tightness and its rigidity. In order to displace the covering, it is sufficient to lower the lower edge of the grooves with respect to their upper edge in a way to unclamp the covering which can be removed completely or brought to the position desired, in which position it is fixed by raising again the lower edge of the grooves.

In the accompanying drawings illustrating a number of embodiments of my invention—

Fig. 4 is a view similar to Fig. 3 of an embodiment of the invention in which a fixed cover is used;

Fig. 5 is a view similar to Fig. 2 of a modified form of groove;

Fig. 6 is a similar view of another modified form of groove;

Figure 1:
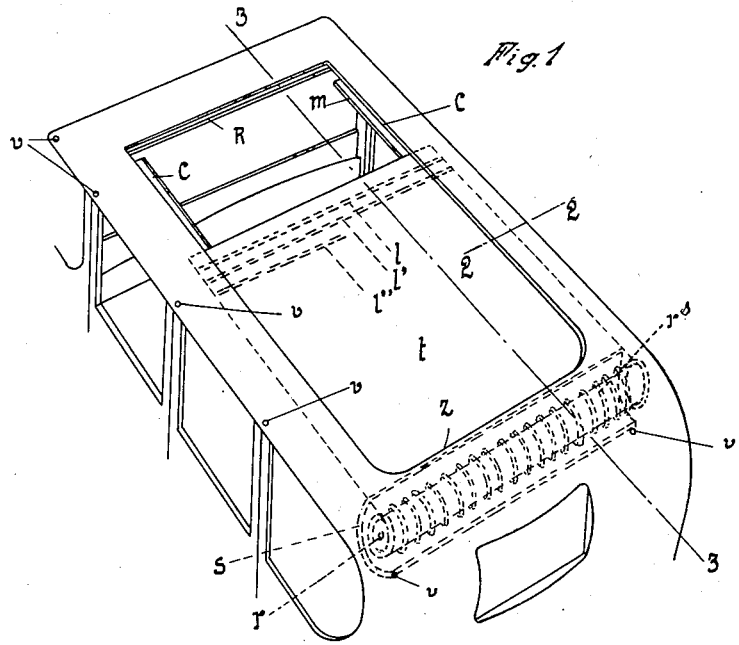
Fig. 1 is a perspective view of an opening top provided with a cover according to the invention.
Figure 2:
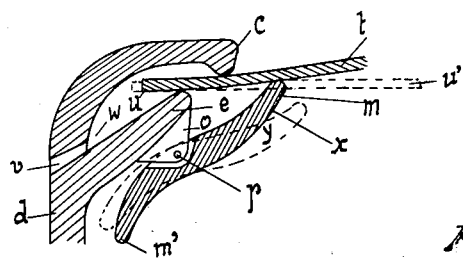
Fig. 2 is a section along the line 2—2 of Fig. 1 to a larger scale.
Figure 3:
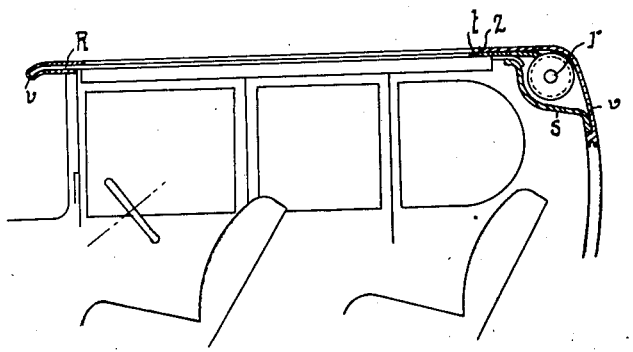
Fig. 3 is a section taken along the line 3—3 of Fig. 1.

Referring to Figs. 1 to 3, $t$ designates the removable cover composed of a flexible surface which is provided in this embodiment with a reinforcing consisting of metallic bands 1, 1', 1'' which give the cover proper rigidity in the transverse direction.

The longitudinal edges of the roof $t$ are guided in lateral grooves $c$ $d$ $e$ which occupy the upper part of the so-called top.

As shown in Fig. 2, the lower edge $e$ of said grooves is provided with a jaw $m$, pivoted at $p$ in under lugs on said edge. Said jaw is adapted to project beyond the upper edge $c$ of the groove. When it is moved toward the edge, the cover is clamped between $c$ and $e$ and at the same time, the jaw $m$ transversely curves the cover as indicated in full lines in Fig. 2, which prevents rattling of the cover as well as rendering the same more rigid.

The cover is moreover fixed and rendered watertight. The small quantities of water which could still infiltrate occasionally between the cover $t$ and the flange $c$ are received in a gutter $w$ formed by the members $c$ and $e$. The said water flows to the outside through openings $v$, provided for this purpose at the bottom of the gutter.

When the jaw $m$ is unclamped, the roof again becomes flat and is free as indicated by the dotted lines in the position $u'$ of Fig. 2.

The jaw $m$ may be of a single piece or formed of several segments.

The cover $t$ (Figs. 1 and 3) winds upon a drum $r$, disposed either at the rear of the vehicle as illustrated or at any other point found suitable. Said drum is provided with a spring $r^s$ which tends to constantly cause the drum to turn in the direction corresponding to the winding of the cover. This winding therefore takes place automatically as soon as the jaw $m$ releases the cover. The drum $r$ may be furnished in addition with a pawl and ratchet device which causes the roller to respond to the action of the spring only when the said pawl and ratchet is released.

Said drum is lodged in a housing $s$ provided near its base with orifices $v$ for evacuating any water which may infiltrate therein.

In the embodiment under consideration, the cover engages in front of the vehicle in a groove R, situated above the wind-shield and which may, if desired, be furnished with movable jaws similar to those provided for the longitudinal guide grooves of the cover. The bottom of groove R is provided with holes similar to $v$ for evacuating water.

The operation of the device takes place in three steps. The first consists in unclamping the jaws, the second in sliding the cover, and the third in reclamping the jaws for maintaining the cover in the position desired.

The embodiment just considered has been applied to a vehicle body with a removable roof or cover.

My device is equally applicable to vehicles in which the roof is stationary and remains closed. I thus eliminate the cross pieces usually employed for supporting the roof. Such cross pieces are dangerous to the occupants of the vehicle since during passage over culverts or other obstacles in the road such persons can be thrown violently against the roof and injure the head. My device overcomes these dangers due to its flexibility. In Fig. 4 is shown such an embodiment in the case of a fixed roof and in which the longitudinal grooves are simply prolonged to the rear end of the vehicle where the water is evacuated.

Fig. 5 shows a modification in which the clamping members are in the form of pincers disposed along the longitudinal edges of the cover and answering the purpose of both grooves and jaws.

The part $c'$ and $d'$ is stationary, the member $e'$ no longer serves as a clamp and the movable part $m\ m'$ constituting the jaw is pivoted directly on the member $c'\ d'$. A gutter G is provided for receiving the water which may infiltrate between the roof $t$ and the fixed parts $c'\ d'$.

In Fig. 6 is shown an embodiment in which the member $m\ m'$ is pivoted on the member $e'$ and has its edge provided with rollers $m''$ to allow easy sliding of the cover. I may in certain cases place similar rollers on the flange $c'$ of the groove.

Figure 7:
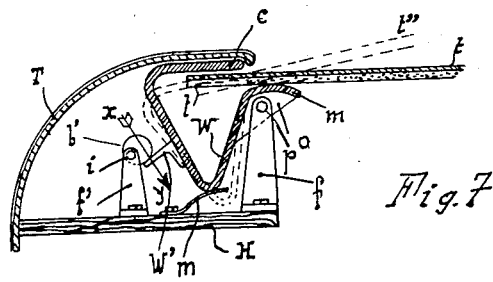
Fig. 7 is a similar view illustrating still another modification of the invention.
Figure 11:
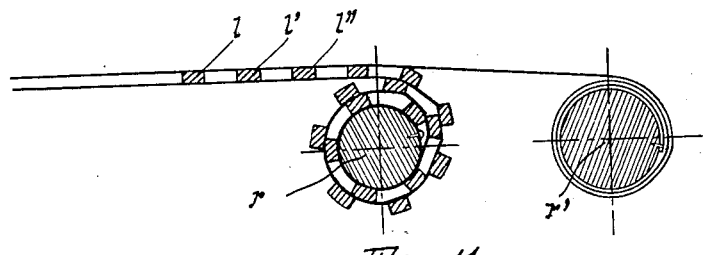
Fig. 11 is a longitudinal sectional detail of Fig. 10 to a larger scale.

The embodiment shown in Fig. 7 is easier to manufacture, less complicated, and consequently less expensive.

In this embodiment the lower projecting edge of the longitudinal guide grooves forms with the upper edge thereof a single gutter piece W which pivots about axes as close as possible to the edge of the upper flange. To this end, the member W carries at intervals ears $o$, provided with pivots $p$ turning in supports $f$ supported by a rigid sill $h$ extending along horizontally above the bays of the vehicle body.

The movements of oscillation of the member W are communicated thereto by means of eccentrics $i'$ keyed on a common shaft $i$ which is supported by vertical arms in turn supported by the sill $h$. Said eccentrics engage arms $w'$ distributed along the member W. Springs $m$ are adapted to constantly urge said arms against the eccentrics corresponding thereto. The whole mechanism is covered with a curved sheet metal member T, fixed to the sill H.

The manipulation of the movable cover may be brought about by any suitable means such as by hand, electric motor, pneumatic motor and the like.

Figure 8:
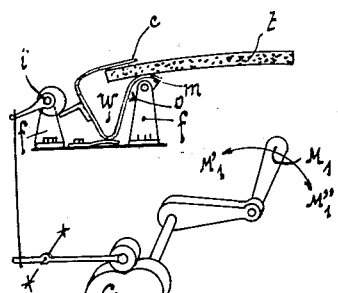
Fig. 8 is a diagrammatic perspective view of the controlling mechanism for the cover and the grooves with the means for combining their action.

I prefer however to control the cover by the device illustrated in Fig. 8. A piston $G^1$ is adapted to be displaced in a cylinder V and is connected to the cover by means of a cable $z'$ which passes over tackle block pulleys $b^1$ carried by the piston and $b^2$ mounted on a stationary shaft, the end of said cable being finally attached to a fixed point. Two valves $s''$ and $s'''$, placed near the cylinder head are adapted to respectively place the interior of said cylinder into communication with the atmosphere and with the intake pipe of the vehicle motor.

For opening one or the other of these valves according to whether it is desired to displace the piston or stop it, I have recourse to a mechanism combined with that which was adapted to operate the eccentrics $i'$ controlling the grooves W. The whole is combined in a way that the grooves W release the edges of the cover before the piston G has started to move.

The complete operating device comprises a shaft provided with a crank $M_1$ for controlling and carrying three cams $c^1$, $c^2$, $c^3$. The first acts on a roller carrying lever in engagement with a transverse arm of the shaft $i$ of the eccentrics. The cams $c^2$ and $c^3$ act, likewise through the medium of roller levers and cables $b^2$ and $b^3$ act respectively on the valves $s''$ and $s'''$.

The edge of the opening of cylinder V indicated at $R^1$ is turned over at its lower part in a way to retain the lubricating oil which is sucked in through a tube $t''$ on the other side of the piston when the valve air inlet $s''$ is opened. The return stroke of the piston is effected by the action of the spring instigating the winding up of the cover.

Figure 9:
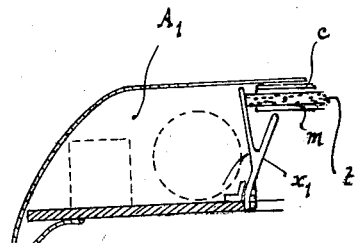
Fig. 9 is a transverse section through the pent roof of the top showing the disposition of the elements illustrated in Fig. 8.

The whole mechanism is preferably lodged in the pent roof of the vehicle top (Fig. 9) as shown at $A^1$. The rear wall $x^1$ of said pent roof is in the form of two arms obliquely disposed and of unequal length which constitute a gutter for evacuating the water which infiltrates toward the pent roof A.

Figure 10:
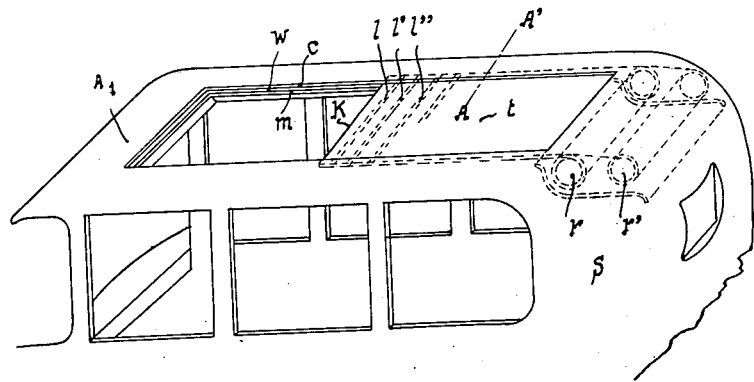
Fig. 10 is a perspective view of a modification of Fig. 1.
Figure 12:
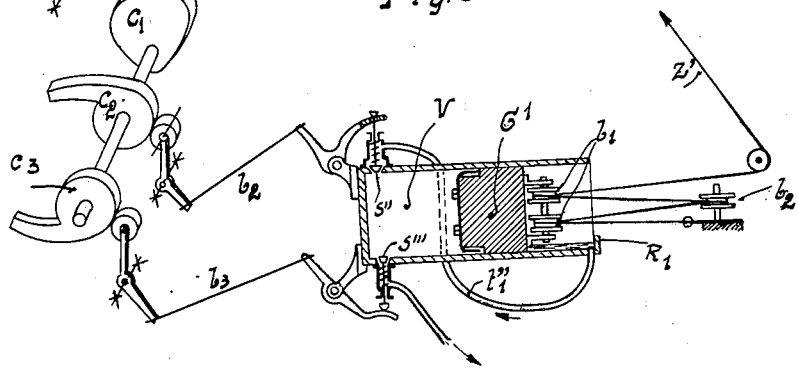
Fig. 12 is a longitudinal sectional view illustrating a modification.

In order to prevent the movable cover whose thickness is sometimes considerable, from taking false folds in winding up, I may compose the same of two superposed layers but independent of each other winding on separate parallel rollers $r\ r'$. These rollers can be situated at the rear as shown in Fig. 10 or at the front of the vehicle as shown in Fig. 12.

During winding and unwinding the two layers move simultaneously in the same direction and at the same speed. The lower layer serves to support the upper layer as long as both layers are engaged in the guiding grooves. In order that the lower layer can suitably serve as a support, I reinforce the same with transverse strips or the equivalent adapted to allow curving of the roof.

Having described my invention what I claim as new and desire to secure by Letters Patent is:

1. An opening top for vehicles comprising a flexible covering, a spring roller normally tending to wind up said covering, a pivotally mounted triangular guide member adapted to receive the edges of said covering, an eccentric for rocking said guide member in order to clamp the edges of said covering therein, means including a cylinder, a piston in said cylinder, a fluid inlet valve, and a fluid outlet valve for said cylinder for drawing said cover against the action of said spring, a manually operable shaft, a cam on said shaft for operating said eccentric and a pair of cams on said shaft adapted to successively operate said inlet and outlet valves respectively subsequent to the operation of said eccentric.

2. A roof for a vehicle which comprises two fixed longitudinal side roof elements integral with the vehicle body, a flexible covering extending between said elements with its edges underlapping them and adapted to freely slide thereunder, means carried by said roof elements for pressing on the upper surface of said flexible covering at a certain distance from the edges thereof, movable means carried by said roof elements for pressing on the under surface of the flexible covering at a substantially greater distance from the edges thereof, whereby the flexible covering is both clamped and cambered between said elements, and means for controlling the displacement of the last mentioned means.

3. A roof for a vehicle which comprises two fixed longitudinal side roof elements integral with the vehicle body, a flexible covering extending between said elements with its edges underlapping them and adapted to freely slide thereunder, a downwardly projecting ridge on the inner edge of each of said roof elements adapted to press on the upper surface of said covering at a certain distance from the corresponding edge thereof, and a jaw pivotally mounted on each of said roof elements about a longitudinal axis, said jaw being adapted to press on the under surface of said covering at a distance from the corresponding edge thereof that is substantially greater than the above mentioned distance, whereby the flexible covering is both clamped and cambered between said elements.

4. A roof for a vehicle which comprises two longitudinal side roof elements integral with the vehicle body, a flexible covering extending between said elements with its edges underlapping them and adapted to freely slide thereunder, a downwardly projecting ridge on the inner edge of each of said roof elements adapted to press on the upper surface of said covering at a certain distance from the corresponding edge thereof, an upwardly and inwardly extending edge integral with each of the vertical sides of the vehicle body located below the corresponding roof element, and a jaw pivotally mounted on said ledge about a longitudinal axis, said jaw being adapted to press on the under side of said covering at a distance from the corresponding edge thereof that is substantially greater than the above mentioned distance, whereby the flexible covering is both clamped and cambered between said elements.

5. A roof for a vehicle which comprises two fixed longitudinal side roof elements integral with the vehicle body, a flexible covering extending between said elements with its edges underlapping them and adapted to freely slide thereunder, a downwardly projecting ridge on the inner edge of each of said roof elements adapted to press on the upper surface of said covering at a certain distance from the corresponding edge thereof, an upwardly and inwardly extending ledge integral with each of the vertical sides of the vehicle body located below the corresponding roof element, a jaw pivotally mounted on said ledge about a longitudinal axis, and a plurality of rollers at the upper end of said jaw adapted to press on the under side of said covering at a distance from the corresponding edge thereof that is substantially greater than the above mentioned distance, whereby the flexible covering is both cambered and clamped between said elements.

6. A roof for a vehicle which comprises two fixed longitudinal side roof elements integral with the vehicle body, two gutter shaped longitudinal members having substantially parallel edges disposed below said roof elements respectively, said gutter shaped members being pivotally mounted about longitudinal axes on the vehicle body, a flexible covering adapted to freely engage said gutter shaped members when the parallel edges thereof are substantially horizontal, and means for rotating said gutter shaped members in opposite directions whereby the flexible covering can be both clamped and cambered between the parallel edges of the gutter shaped elements.

7. A roof for a vehicle which comprises two fixed longitudinal side roof elements integral with the vehicle body, two gutter shaped longitudinal members having substantially parallel edges disposed below said roof elements respectively, said gutter shaped members being pivotally mounted about longitudinal axes on the vehicle body, a flexible covering adapted to freely engage said gutter shaped members when the parallel edges thereof are substantially horizontal, a spring roller adapted to receive the covering and tending to wind it up, means for rotating said gutter shaped members in opposite directions, whereby the flexible covering can be both clamped and cambered between the parallel edges of the gutter shaped elements, and means for drawing said covering against the action of said spring roller.

8. A roof for a vehicle which comprises two longitudinal side roof elements integral with the vehicle body, two gutter shaped longitudinal members having substantially parallel edges disposed below said roof elements respectively, said gutter shaped members being pivotally mounted about longitudinal axes on the vehicle body, a flexible covering adapted to freely engage said gutter shaped members when the parallel edges thereof are substantially horizontal, eccentric for rotating said gutter shaped members in opposite directions, whereby the flexible covering can be both clamped and cambered between the parallel edges of the gutter shaped members, and manually operated means for controlling said eccentrics.

9. A roof for a vehicle which comprises two fixed longitudinal side roof elements integral with the vehicle body, two gutter shaped longitudinal members having substantially parallel edges disposed below said roof elements respectively, said gutter shaped members being pivotally mounted about longitudinal axes on the vehicle body, a flexible covering adapted to freely engage said gutter shaped members when the parallel edges thereof are substantially horizontal, a spring roller adapted to receive said covering and tending to wind it up, eccentrics for rotating said gutter shaped members in opposite directions, whereby the flexible covering can be both clamped and cambered between the parallel edges of the gutter shaped members, means for drawing said covering against the action of the spring roller, and manual means for controlling the operation of said eccentrics.

10. A roof for an automobile which comprises two longitudinal side roof elements integral with the automobile body, two gutter shaped longitudinal members having substantially parallel edges disposed below said roof elements respectively, said gutter shaped members being pivotally mounted about longitudinal axes on the vehicle body, a flexible covering adapted to freely engage said gutter shaped members when the parallel edges thereof are substantially horizontal, a spring roller adapted to receive said covering and tending to wind it up, eccentrics for rotating said gutter shaped members in opposite directions, whereby the flexible covering can be both clamped and cambered between the parallel edges of the gutter shaped members, means actuated by the automobile engine for drawing said covering against the action of the spring roller and manual means for controlling the action of the eccentrics.

11. A roof for an automobile which comprises two fixed longitudinal side roof elements integral with the automobile body, two gutter shaped longitudinal members having substantially parallel edges disposed below said roof elements respectively, said gutter shaped members being pivotally mounted about longitudinal axes on the automobile body, a flexible covering adapted to freely engage said gutter shaped members when the parallel edges thereof are substantially horizontal, a spring roller adapted to receive said covering and tending to wind it up, eccentrics for rotating said gutter shaped members in opposite directions, whereby the flexible covering can be both clamped and cambered between the parallel edges of the gutter shaped members, means actuated by the automobile engine for drawing said covering against the action of the spring roller, and manual means for simultaneously controlling the operation of said eccentrics and the operation of the above mentioned means for drawing said covering.

12. A roof for a vehicle which comprises two fixed longitudinal side roof elements integral with the vehicle body, a flexible covering extending freely across the space between said elements with its edges underlapping them and adapted to freely slide thereunder in a longitudinal direction, means carried by said roof element for pressing on the upper surface of said flexible covering at a certain distance from the edges thereof, movable means carried by said roof elements for pressing on the under surface of the roof covering at a substantially greater distance from the edge thereof, whereby the flexible covering is both clamped and cambered between said elements, and means for controlling the displacement of the last mentioned means.

13. A roof for a vehicle which comprises two fixed longitudinal side roof elements integral with the vehicle body, a flexible covering extending freely across the space between said elements with its edges underlapping them and adapted to freely slide thereunder in a longitudinal direction, means carried by said roof elements for pressing on the upper face of said flexible covering at a certain distance from the edges thereof, rotatable means pivoted to said roof elements for pressing on the under surface of said flexible covering at a substantially greater distance from the edges thereof, whereby said flexible covering can be both clamped and cambered between said elements, and means for controlling the angular displacement of the last mentioned means.

14. A roof for a vehicle which comprises two fixed longitudinal side roof elements integral with the vehicle body, a flexible covering extending freely across the space between said elements with its edges underlapping them and adapted to freely slide thereunder in a longitudinal direction, means carried by said roof elements for pressing on the upper surface of said flexible covering at a certain distance from the edges thereof, rotatable means pivoted to said roof elements for pressing on the under surface of said flexible covering at a substantially greater distance from the edges thereof, whereby the flexible covering can be both clamped and cambered between said elements, and means, operatively connected to said rotatable means for releasing the pressure exerted by them on the under face of the roof, whereby said roof covering can be caused to slide without friction between said rotatable means and the means for pressing on the upper face of the flexible covering.

THOMAS VINCENT D'ORNELLAS.